United States Patent

[11] 3,562,593

| [72] | Inventor | Fred Bould<br>Edgewood, Pa. |
|---|---|---|
| [21] | Appl. No | 788,168 |
| [22] | Filed | Dec. 31, 1968 |
| [45] | Patented | Feb. 9, 1971 |
| [73] | Assignee | Westinghouse Electric Corporation<br>Pittsburgh, Pa.<br>a corporation of Pennsylvania |

[54] METAL-ENCLOSED SWITCHGEAR WITH VERTICALLY DISPOSED CONDUCTORS
9 Claims, 5 Drawing Figs.

[52] U.S. Cl............................................. 317/103,
317/112
[51] Int. Cl.......................................... H02b 1/20,
H02b 11/12
[50] Field of Search.......................................... 317/103,
112, 117, 119, 120; 200/50.15

[56] References Cited
UNITED STATES PATENTS
| 2,298,828 | 10/1942 | Mahoney...................... | 317/103 |
| 2,767,266 | 10/1956 | Hawkins....................... | 317/103X |
| 3,188,413 | 6/1965 | Netzel........................... | 317/103 |
| 3,308,348 | 3/1967 | Olashaw....................... | 317/119 |
| 3,130,353 | 4/1964 | Mount........................... | 317/103 |

Primary Examiner—Lewis H. Myers
Assistant Examiner—Gerald P. Tolin
Attorneys—A. T. Stratton and C. L. McHale

ABSTRACT: In order to enable horizontally extending main phase bus bars in metal-enclosed switchgear to be made in standardized unit lengths, it is necessary that the breaker compartment widths be made a constant dimension. This is achieved by keeping the horizontal distance between poles of the breaker units a constant value irrespective of the current rating of the breakers. The primary disconnect contact system of the removable breaker units is so constructed that the extra conductor cross section required as the current capacity is increased is obtained by changing the vertical dimensions of the current carrying members and keeping the horizontal dimensions substantially constant.

3,562,593

METAL-ENCLOSED SWITCHGEAR WITH VERTICALLY DISPOSED CONDUCTORS

BACKGROUND OF THE INVENTION

This invention relates, generally, to metal-enclosed switchgear and more particularly, to the primary disconnect contact system and current conductors of metal-enclosed switch gear having removable circuit breaker units.

In order to reduce the cost of metal-enclosed switchgear, it is desirable to enable the main phase bus bars to be made in standardized unit lengths for switchgear units containing a predetermined number of cells or compartments which house circuit breakers of different current ratings. Also, it is desirable to utilize standardized parts in the cell structures. To achieve these results it is necessary that the horizontal distance between pole centers of the breaker units be a constant value irrespective of the current rating of the breakers. Heretofore, the pole center distance on circuit breaker units of the horizontal drawout type having primary disconnect members has increased as the current rating increased.

Accordingly, an object of this invention is to maintain a constant pole center distance irrespective of the current rating of circuit breaker units of the horizontal drawout type having primary disconnect members.

Another object of the invention is to provide a primary disconnect system and conductor arrangement for metal-enclosed switchgear in which the vertical dimension of horizontally extending current carrying members is changed for different current ratings and the horizontal dimension is kept substantially constant.

Other objects of the invention will be explained fully hereinafter or will be apparent to those skilled in the art.

SUMMARY OF THE INVENTION

In accordance with one embodiment of the invention, multipole circuit breaker units are removably mounted at different elevations in breaker subcompartments at the front of a metal-enclosed switchgear cell structure. Horizontally extending main phase bus bars and vertical risers are mounted in a bus compartment at the rear of the breaker compartment. Each pole of each breaker unit has vertically spaced incoming and outgoing primary disconnect members. Each disconnect member comprises a plurality of pairs of vertically spaced contact fingers removably mounted on a generally rectangular in cross section conducting member in the circuit breaker. The contact fingers of one disconnect member for each pole are spaced horizontally to engage vertically disposed sides of a generally rectangular stab conductor which extends from the breaker compartment into the bus compartment where it is connected to a vertical riser which is connected to one of the main phase bus bars. The other disconnect member for each pole engages vertical sides of a generally rectangular feeder conductor which extends through the bus compartment into a cable compartment at the rear of the bus compartment. The current-carrying capacity of the disconnect system is varied by changing the number of contact fingers and the vertical dimensions of the current-carrying members and keeping the horizontal dimensions substantially constant, thereby maintaining a constant width of the breaker compartments for different current ratings of the breaker units.

BRIEF DESCRIPTION OF THE DRAWINGS

For a better understanding of the nature and objects of the invention, reference may be had to the following detailed description, taken in conjunction with the accompanying drawings, in which.

DESCRIPTION OF THE PREFERRED EMBODIMENT

Figure 1:
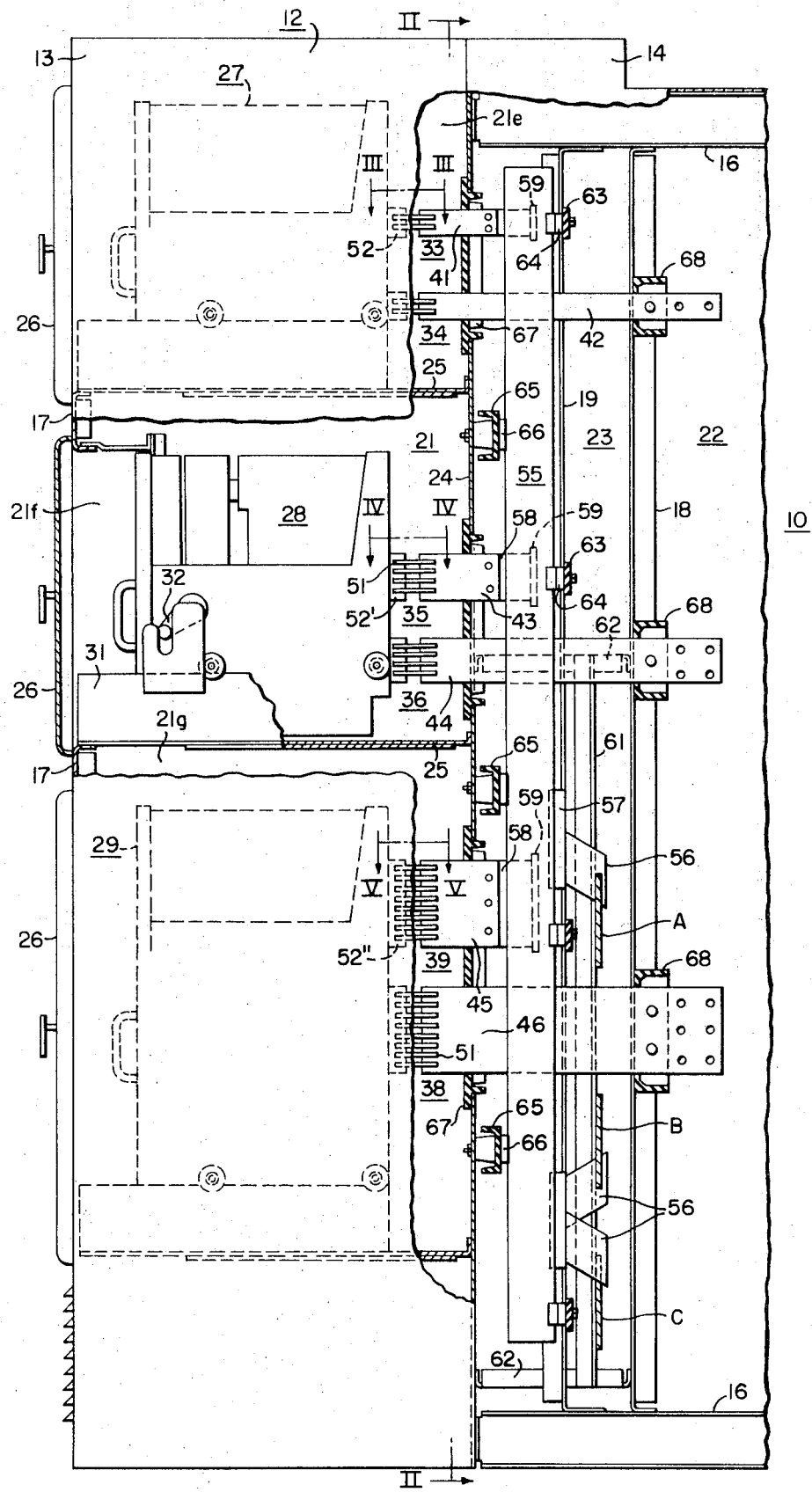
FIG. 1 is a view, partly in side elevation and partly in section, of a metal-enclosed switchgear structure embodying principal features of the invention.
Figure 2:
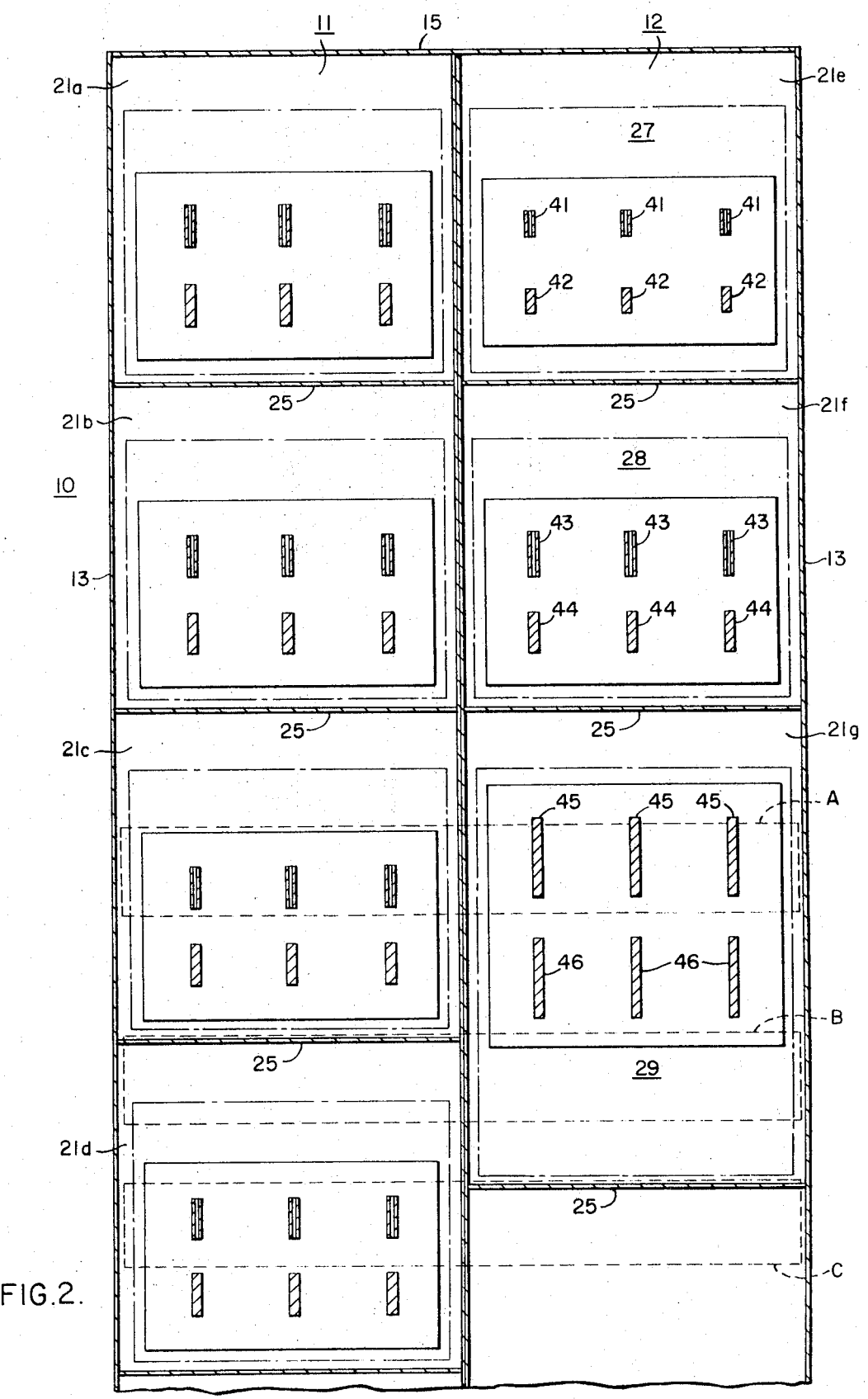
FIG. 2 is a view, in section, taken along the line II–II in FIG. 1.

Referring to the drawings, particularly to FIGS. 1 and 2, a switchgear unit 10 shown therein comprises two generally rectangular upstanding sections or cells 11 and 12 disposed in side-by-side relation. It will be understood that additional cells may be added as desired. The cells may be generally of the type described in U.S. Pat. No. 2,424,345 issued Jul. 22, 1947 to Charles P. West and assigned to the Westinghouse Electric Corporation. The structure of the cells will not be described in detail in this application. Generally, each cell comprises side sheets 13 and 14 and a cover sheet 15 attached to horizontal channel members 16 and 17 and vertical angle members 18 and 19 extending between and attached to the horizontal channel members 16. The channel members 17 extend between the side sheets 13 and 14. Additional channel members not shown in the present drawing may be included in the cell structure.

As shown more clearly in FIG. 1, each cell has a breaker compartment 21 at the front, a cable compartment 22 at the rear and a bus compartment 23 between the breaker compartment and the cable compartment. The breaker compartment 21 is separated from the bus compartment 23 by a vertical sheet metal barrier 24. The breaker compartment 21 is subdivided into a plurality of subcompartments by horizontal barriers 25. Each subcompartment has a hinged door 26 at the front of the cell structure.

As shown in FIG. 2, the cell 11 has four subcompartments 21a, 21b, 21c and 21d. These subcompartments are disposed one below the other and they are all the same height and width. The cell 12 has three subcompartments 21e, 21f, and 21g. The subcompartments 21e and 21f are the same height and width as the subcompartments in the cell 11. The subcompartment 21g is the same width as the other compartments, but is of different height. As shown in FIG. 1, all of the subcompartments are of the same depth horizontally.

As also shown in FIG. 1, circuit breaker units 27, 28 and 29 are mounted in the subcompartments 21e, 21f and 21g, respectively. The breaker units may be of any suitable type, such as, for example, the one described in a copending application Ser. No. 770,297, filed Oct. 24, 1968 by Fred Bould and Richard Hauser and assigned to the Westinghouse Electric Corporation. Each breaker unit is mounted on a track 31 in the cell and is removable horizontally from the cell. A suitable levering device 32 is provided for actuating the breaker unit to predetermined positions in the cell. Further details of the breaker unit construction will not be described in this application.

The breaker unit 27 may have a relatively low current-carrying capacity, the breaker unit 28 may have a higher current-carrying capacity, and the breaker unit 29 may have a still higher current-carrying capacity. As shown, the breaker units are the same width and depth, but the unit 29 has a greater height than the units 27 and 28. As indicated in FIG. 2, the breaker units in the cell 11 may be of the same size as the breaker units 28. The breaker units are of the multipole type, each breaker having three poles.

As shown in FIG. 1, the breaker unit 27 has an incoming primary disconnect member 33 and an outgoing primary disconnect member 34 for each pole of the breaker unit. The disconnect members 33 and 34 are spaced vertically. Likewise, each pole of the breaker unit 28 has an incoming primary disconnect member 35 and an outgoing disconnect member 36 which are vertically spaced. The breaker unit 29 has an incoming primary disconnect member 37 and an outgoing primary disconnect member 38 for each pole of the breaker unit. The members 37 and 38 are vertically spaced.

As shown in FIG. 1, the primary disconnect members 33 engage vertical sides of horizontally extending stab conductors 41, and the primary disconnect members 34 engage vertical sides of horizontally extending feeder conductors 42. Likewise, the primary disconnect members 35 engage stab conductors 43 and the primary disconnect members 36 engage feeder conductors 44. The primary disconnect members 37 engage stab conductors 45 and the primary disconnect members 38 engage feeder conductors 46.

As explained hereinbefore, the breaker units 27, 28 and 29 have different current carrying capacities. In order to obtain the additional cross-sectional area required to carry the higher currents, the vertical dimensions of the stab conductors and the feeder conductors for the breaker units are increased for the units having the higher current ratings, but the horizontal dimension of the generally rectangular conductors remains the same. Thus, as shown in FIG. 2, the horizontal distance between pole centers for the breaker units is of a constant value irrespective of the current rating of the different breaker units.

Figure 3:
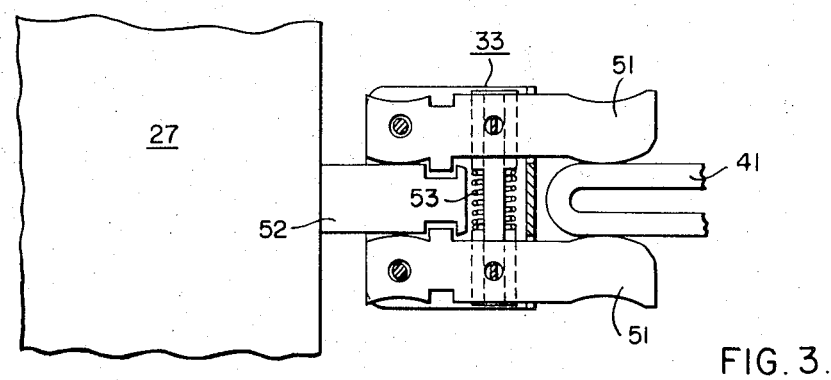
FIGS. 3, 4 and 5 are enlarged detail views in plan, looking in the direction of the lines III–III, IV–IV and V–V, respectively, in FIG. 1.

The primary disconnect members for the breaker units may be of any suitable type, such as, for example, the one described in a copending application Ser. No. 938, 996, filed Mar. 31, 1966 by Joseph D. Findley and issued Feb. 11, 1969 as U.S. Pat. No. 3,427,419 and which is assigned to the Westinghouse Electric Corporation. As shown in FIGS. 1 and 3, each primary disconnect member comprises a plurality of pairs of vertically spaced contact fingers 51 removably mounted on a generally rectangular conducting member 52 in the breaker unit. As shown in FIG. 3, the contact fingers 51 of each pair of fingers are horizontally spaced to engage vertical sides of either a stab conductor or a feeder conductor as the case may be. As described in the aforesaid copending application, the contact fingers 51 are biased towards each other by spring members 53. Primary disconnect members of other types, for example, the one described in U.S. Pat. No. 2,254,914, issued Sept. 2, 1941 to H. H. Rugg may be utilized. Therefore, further details of the primary disconnect members will not be described in this application.

As shown in FIG. 1, the number of contact fingers 51 in each primary disconnect member and the vertical dimension of the conducting members 52 on which the contact fingers are mounted are increased as the current rating of the circuit breaker unit is increased. In this manner the current capacity of the primary disconnect members is increased without increasing the horizontal dimension of the disconnect member, thereby enabling the distance between the pole centers of the breaker unit to be kept at a constant value irrespective of the current rating of the breaker unit.

Figure 4:
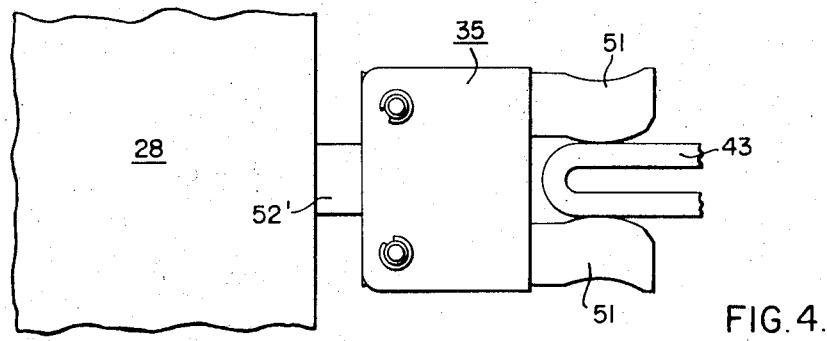
Figure 5:
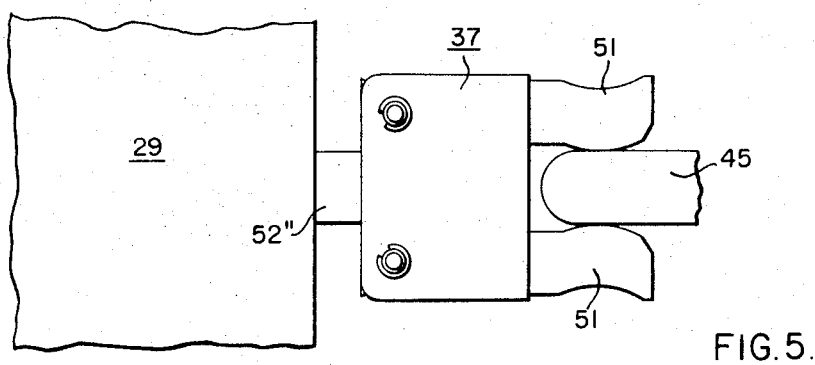

As shown in FIGS. 3, 4 and 5, the stab conductors 41 and 43 may be of a U-shape with generally rectangular legs having vertical sides engaged by contact fingers 51. The stab conductor 45 may be a solid generally rectangular conductor having vertical sides engaged by contact fingers 51.

Accordingly, as shown in FIG. 2, horizontally extending main phase bus bars A, B and C may be made in standardized unit lengths depending upon the number of cells provided in a switchgear unit. Thus, the main phase bus bars may be made in standardized lengths irrespective of the current ratings of the breaker units in the switchgear cells. The necessary current-carrying capacity of the main phase bus bars may be obtained by increasing the cross-sectional area of each bus bar, or by providing a plurality of bus bars for each phase.

The arrangement of the main phase bus bars and the manner of connecting the bus bars to riser assemblies 55 may be similar to that described in a copending application Ser. No. 788,176 filed Dec. 31, 1968. Each riser assembly 55 may comprise two generally rectangular bars or conductors or it may be a channel-shaped conductor. There are three riser assemblies 55 for each cell. Each riser assembly is connected to one of the main phase bus bars by bus connectors 56 which may be of the type described in the aforesaid copending application Ser. No. 788,176. The bus connectors 56 may be attached to a main phase bus bar and to bus tie members 57 by metallurgical bonding, such as welding. Likewise, the bus tie members 57 may be attached to the riser conductors by metallurgical bonding.

The stab conductors for the corresponding phase of the vertically aligned breaker units in a cell are all connected to one vertical riser assembly which is connected to the corresponding main phase bus bar. The stab conductors are attached to rectangular conductors 58 which, in turn, are attached to rectangular conductors 59 extending between and attached to the spaced vertical conductors of each riser assembly or to the sides of a channel conductor when a channel member is utilized as a riser conductor. As shown in FIG. 1, the vertical dimensions of the rectangular conductors 58 and 59 is increased in a manner corresponding to the increase of the vertical dimension of the stab conductors as the current rating of the circuit breaker units is increased.

The main phase conductors A, B and C are supported by vertical insulating members 61 which, in turn, are supported by horizontal members 62 extending between and attached to the vertical barrier 24 and the vertical members 18. The riser assemblies 55 are supported by horizontal insulating members 63 which are attached to the vertical members 19. The riser conductors are attached to the horizontal members 63 by means of connecting members 64 which may be attached to the riser conductors by metallurgical bonding. The riser conductors are also supported by horizontal insulating members 65 which are attached to the vertical barrier 24. The riser conductors are attached to the insulators 65 by connecting members 66 which may be attached to the riser conductors by metallurgical bonding.

The stab conductors are supported by insulating members 67 attached to the vertical barrier 24. The feeder conductors are also supported by the insulating members 67 and by insulating members 68 attached to the vertical member 18. As shown, the feeder conductors extend from the breaker compartment through the bus compartment into the cable compartment where they may be attached to feeder cables when the switchgear is installed.

From the foregoing description, it is apparent that the invention provides a switchgear structure in which the distance between the pole centers of multipole circuit breaker units is maintained at a constant value irrespective of the current rating of the circuit breaker units, thereby enabling the width of the cells containing the breaker units to be kept at a constant value which, in turn, enables the main phase bus bars which extend across adjoining cells to be made in standardized unit lengths depending upon the number of cells provided in a switchgear unit. Furthermore, other parts of the switchgear structure may be standardized, thereby decreasing the cost of the structure. The metal-enclosed switchgear herein described is particularly suitable for containing circuit breaker units of the horizontal drawout type.

Since numerous changes may be made in the above described construction and different embodiments of the invention may be made without departing from the spirit and scope thereof, it is intended that all subject matter contained in the foregoing description or shown in the accompanying drawing shall be interpreted as illustrative and not in a limiting sense.

I claim:

1. Metal-enclosed switchgear comprising a generally rectangular upstanding cell structure having a breaker compartment at the front and a bus compartment at the rear of the breaker compartment, said breaker compartment being divided into a plurality of subcompartments of the same width and depth horizontally, multipole circuit breaker units removably mounted in the subcompartments at different elevations, each breaker unit having at least two vertically spaced primary disconnect members per pole, each disconnect member comprising a plurality of pairs of vertically spaced contact fingers, at least two vertically spaced generally rectangular in cross section conductors per pole supported by said cell structure, and said conductors extending from the bus compartment into the breaker compartment with opposite sides of said conductors disposed vertically for engagement by said contact fingers, whereby the horizontal distance between poles remains substantially constant irrespective of the current rating of the breaker units and only the vertical dimension of each conductor is changed for different current ratings of the breaker units.

2. The switchgear defined in claim 1, wherein the number of pairs of contact fingers in the disconnect members is changed for different current ratings of the breaker units.

3. The switchgear defined in claim 1, wherein the height of the breaker units and corresponding subcompartments is changed for certain current ratings of the breaker units.

4. The switchgear defined in claim 1, wherein the contact fingers of each pair of contact fingers are spaced horizontally.

5. The switchgear defined in claim 1, wherein each breaker unit includes at least two vertically spaced generally rectangular conducting members per pole upon which the disconnect members are removably mounted, only the vertical dimension of said conducting members being changed for different current ratings of the breaker units.

6. A metal-enclosed switchgear unit comprising a plurality of generally rectangular cell structures disposed side-by-side, each cell structure having a breaker compartment at the front and a cable compartment a the rear and a bus compartment between the breaker compartment and the cable compartment, said breaker compartments being divided into a plurality of subcompartments of the same width and depth horizontally, multipole circuit breaker units removably mounted in the subcompartments at different elevations, each pole of each breaker unit having vertically spaced incoming and outgoing primary disconnect members, each disconnect member comprising a plurality of pairs of vertically spaced contact fingers, at least three main phase bus bars mounted in the bus compartment and extending horizontally across the switchgear unit, at least three vertical risers for each cell structure, said risers being mounted in the bus compartment, at least two vertically spaced generally rectangular in cross section conductors for each pole of each breaker unit, one of said conductors for each pole being connected to one of said risers and having opposite sides disposed vertically for engagement by the incoming disconnect member for that pole, the other of said conductors for each pole having opposite sides disposed vertically for engagement by the outgoing disconnect member for that pole and extending through the bus compartment into the cable compartment, and vertically disposed bus connectors connecting each one of the main phase bus bars to a corresponding phase riser in each cell structure, whereby the horizontal distance between poles of the breaker units is substantially constant and the length of the main phase bus bars for a switchgear unit varies in accordance with the number of cell structures in the unit.

7. The switchgear unit defined in claim 6, wherein the height of the breaker units and corresponding subcompartments in a cell structure is changed for certain current ratings of the breaker units.

8. The switchgear unit defined in claim 6, wherein only the vertical dimension of each rectangular conductor for each pole of each breaker unit is changed for different current ratings of the breaker unit.

9. The switchgear unit defined in claim 6, wherein the horizontal width and depth of each cell structure are the same for all the cell structures in the switchgear unit.